(12) United States Patent
Ishida et al.

(10) Patent No.: US 8,396,638 B2
(45) Date of Patent: Mar. 12, 2013

(54) VEHICLE DRIVE CONTROL DEVICE

(75) Inventors: Yasuhito Ishida, Toyokawa (JP); Gen Inoue, Susono (JP)

(73) Assignee: Advics Co., Ltd., Kariya (JP)

( * ) Notice: Subject to any disclaimer, the term of this patent is extended or adjusted under 35 U.S.C. 154(b) by 1100 days.

(21) Appl. No.: 12/204,286

(22) Filed: Sep. 4, 2008

(65) Prior Publication Data

US 2009/0069995 A1 Mar. 12, 2009

(30) Foreign Application Priority Data

Sep. 6, 2007 (JP) ................. 2007-232072

(51) Int. Cl.
*B60K 31/00* (2006.01)
*B60K 28/16* (2006.01)
*G06F 17/00* (2006.01)
*G05D 1/00* (2006.01)

(52) U.S. Cl. ............. 701/70; 701/93; 180/170
(58) Field of Classification Search .......... 701/70, 701/73, 74, 79, 82, 86, 90, 93; 180/170, 180/197

See application file for complete search history.

(56) References Cited

U.S. PATENT DOCUMENTS

| | | | | |
|---|---|---|---|---|
| 4,850,656 A | * | 7/1989 | Ise et al. | 303/192 |
| 5,665,026 A | * | 9/1997 | Linden | 477/108 |
| 5,679,092 A | * | 10/1997 | Otsubo et al. | 477/97 |
| 6,351,702 B1 | | 2/2002 | Tange et al. | |
| 2004/0215385 A1 | | 10/2004 | Aizawa et al. | |

FOREIGN PATENT DOCUMENTS

| | | |
|---|---|---|
| JP | 08-318836 A | 12/1996 |
| JP | 08-318836 A | 12/1996 |
| JP | 2000-203303 A | 7/2000 |
| JP | 2000-203303 A | 7/2000 |
| JP | 2004-090679 A | 3/2004 |

OTHER PUBLICATIONS

Japanese Office Action dated Feb. 20, 2012, issued in corresponding Japanese Patent Application No. 2007-232072.
Japanese Office Action dated Dec. 20, 2011, issued in corresponding Japanese Patent Application No. 2007-232072.

* cited by examiner

*Primary Examiner* — Thomas Tarcza
*Assistant Examiner* — Edward Pipala
(74) *Attorney, Agent, or Firm* — Sughrue Mion, PLLC

(57) ABSTRACT

A vehicle drive control device includes a wheel speed detecting means for detecting a rotational speed of a plurality of wheels of a vehicle, a vehicle speed calculating means for calculating a vehicle speed on the basis of the rotational speed of the plurality of wheels detected by the wheel speed detecting means, and an automatic drive controlling means for performing an automatic drive control for controlling the vehicle speed to be a predetermined target speed by controlling a driving force generating means and a vehicle speed reducing means for the vehicle. The automatic drive controlling means further performs a driving force reducing control for reducing a driving force of the vehicle to be generated by the driving force generating means when the rotational speed of at least one of the plurality of wheels detected by the wheel speed detecting means exceeds a predetermined value.

5 Claims, 4 Drawing Sheets

VEHICLE DRIVE CONTROL DEVICE

CROSS REFERENCE TO RELATED APPLICATIONS

This application is based on and claims priority under 35 U.S.C. §119 to Japanese Patent Application 2007-232072, filed on Sep. 6, 2007, the entire content of which is incorporated herein by reference.

FIELD OF THE INVENTION

The present invention generally relates to a vehicle drive control device.

BACKGROUND

In order to reduce a driving operation of a vehicle performed by an operator thereof, a vehicle drive control device for executing an automatic drive control, such as a cruise control for executing a constant speed control by which the vehicle speed is controlled to be a target vehicle speed, an adaptive cruise control (ACC) for controlling the speed of the vehicle to follow a vehicle traveling in front of the subject vehicle (hereinafter referred to as a leading vehicle) while maintaining a distance between the subject vehicle and the leading vehicle, and the like, is adapted to the vehicle. In such a vehicle drive control device, a target driving force is calculated by an automatic drive control ECU as a target control variable so that the vehicle speed is controlled to be a target vehicle speed. Then, the calculated target driving force is outputted to an engine ECU. The engine ECU operates an engine, which serves as a vehicle speed adjusting apparatus for adjusting the vehicle speed on the basis of the target driving force. In such a condition, the vehicle speed is detected by detecting rotational speed of wheels of the vehicle by means of a wheel speed sensor and is controlled to be the target vehicle speed. Further, in the known driving apparatus for the vehicle, the automatic drive control is canceled when an operator performs a braking operation.

Recently, there exists a need for performing an automatic drive control at low speed, for example, at 10 kilometers per hour. In the known driving apparatus for the vehicle, when the operator performs the braking operation while the vehicle drives on a sloped road at the low speed due to the automatic drive control, the automatic drive control may be canceled. When the automatic drive control is canceled while the vehicle drives on the sloped road at the low speed and in a condition where the vehicle is not allowed to stop at the sloped road by the braking force generated by the braking operation of the operator, a position of the vehicle may not be maintained. Therefore, for example, the vehicle may move downwardly, thus a behavior of the vehicle may change.

Because of the above described circumstances, a vehicle drive control device, which does not cancel the automatic drive control even when the operator performs the braking control, has been proposed, For example, JP2004-90679A (hereinafter, referred to as reference 1) discloses a drive control device, by which an automatic drive control ECU reduces a target speed and calculates a target driving force for changing the vehicle speed to the reduced target speed and the engine ECU operates an engine on the basis of the target driving force calculated by the automatic drive control ECU without canceling the automatic drive control even when the operator performs the braking operation, thus lowering the vehicle speed.

When the vehicle drives on a curved road, the speed difference is generated between inner wheels and outer wheels. However, the vehicle includes a differential mechanism, which is a driving force transmitting apparatus for absorbing the speed difference between the inner wheels and outer wheels and further for applying the same level of driving torque from a power source (engine) to the inner wheels and outer wheels. Accordingly, in a condition where one of plural wheels of the vehicle slips while the automatic drive control is performed because of contacting a road surface of which frictional coefficient μ is low, a large driving force may be transmitted to the slipping wheel(s) while driving force transmitted to wheels which are not slipping may be reduced. Therefore, according to the vehicle drive control device of the reference 1, in a condition where one of the wheels slips while the automatic drive control is performed, the braking force is applied to the slipping wheel(s) by a brake apparatus so as to restrain the slipping of the wheels. Thus, by restraining the slipping of the vehicle, the driving force of the engine is transmitted to the other wheels, which are not slipping and applied with less braking force. Therefore, the vehicle is kept driving by the driving force. Though even in such a state where the slipping of the wheel(s) is restrained by the braking force of the brake apparatus, in a condition where the braking force is reduced because of fading phenomenon of a brake pad, for example, the slipping of the wheels may not be restrained.

FIG. 4 is an explanatory view illustrating a wheel speed, a brake torque and all engine output in a condition where one of the wheels slips, according to a known drive control device. Herein, a vehicle speed 353 obtained when the automatic drive control is executed is calculated on the basis of the rotational speed of the wheels detected by the wheel speed sensor. However, in a condition where the rotational speed of one of the wheels is high because of the slipping, the vehicle speed 353 is calculated on the basis of the rotational speed of other wheels which are not slipping and of which rotational speed is low. Thus, in a condition where one of the wheels is slipping, a slipping wheel speed 351, which is a rotational speed of the slipping wheel, becomes high while the vehicle speed 353, which is calculated as a speed of the vehicle being driven, is calculated as a low speed because of being calculated on the basis of a non-slipping wheel speed 352 which is the rotational speed of a non-slipping wheel.

In such a state, because the vehicle drive control device controls the rotational speed of the slipping wheel to be reduced by means of the brake apparatus, a slipping wheel brake torque 355 which corresponds to the brake torque applied to the slipping wheel becomes larger than a non-slipping wheel brake torque 356 which corresponds to the brake torque applied to the non-slipping wheel. However, even in a case where the slipping wheel brake torque 355 is controlled to be larger than the non-slipping wheel brake torque 356, the slipping wheel speed 351 is not reduced when the braking force is reduced due to the fading phenomenon of the brake pad. Therefore, the driving force of the engine is transmitted to the non-slipping wheel(s). Therefore, the non-slipping wheel speed 352 is kept to be low, and the vehicle speed 353 is accordingly calculated to be low on the basis of the non-slipping wheel speed 352.

In such a state, the vehicle speed 353 does not reach a target vehicle speed 365 at the condition where the automatic drive control is performed. Therefore, the vehicle drive control device controls an engine request output 360, which corresponds to level of the output requested to the engine, to be increased so that the vehicle speed 353 approaches the target vehicle speed 365. However, when the slipping wheel keeps slipping, the driving force of the engine is transmitted to the slipping wheel even though the engine output is increased. Accordingly, after a fading occurrence time 371, the slip wheel speed 351 increases while the non-slipping wheel speed 352 is kept to be low.

Accordingly, the vehicle speed 353 calculated on the basis of the non-slipping wheel speed 352 is kept to be low, while the vehicle drive control device controls the engine request output 360 to be further greater so as to match the vehicle speed 353 to the target vehicle speed 365. Thus, in a state where the calculated vehicle speed 353 is controlled to approach (match) the target vehicle speed 365 while one of the wheels is slipping, the output of the engine may be excessively increased, thus causing a malfunction of the vehicle, by damaging the engine and/or a drive train, for example.

A need thus exists for a vehicle drive control device which is not susceptible to the drawback mentioned above.

SUMMARY OF THE INVENTION

According to an aspect of the present invention, a vehicle drive control device includes a wheel speed detecting means for detecting a rotational speed of a plurality of wheels of a vehicle, a vehicle speed calculating means for calculating a vehicle speed on the basis of the rotational speed of the plurality of wheels detected by the wheel speed detecting means, and an automatic drive controlling means for performing an automatic drive control for controlling the vehicle speed to be a predetermined target speed by controlling a driving force generating means and a vehicle speed reducing means for the vehicle. The automatic drive controlling means further performs a driving force reducing control for reducing a driving force of the vehicle to be generated by the driving force generating means when the rotational speed of at least one of the plurality of wheels detected by the wheel speed detecting means exceeds a predetermined value.

According to another aspect of the present invention, a method for controlling a vehicle driving includes a steps of detecting a rotational speed of a plurality of wheels of a vehicle, calculating a vehicle speed on the basis of the rotational speed of the plurality of wheels of the vehicle for controlling the vehicle speed to be a predetermined target speed by controlling a driving force generating means and a vehicle speed reducing means for the vehicle, comparing the rotational speed of each of the plurality of wheels of the vehicle and a predetermined value, and reducing a driving force of the vehicle to be generated by the driving force generating means when the rotational speed of at least one of the plurality of wheels exceeds the predetermined value.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described hereinafter in detail with reference to the attached drawings.

Figure 1:
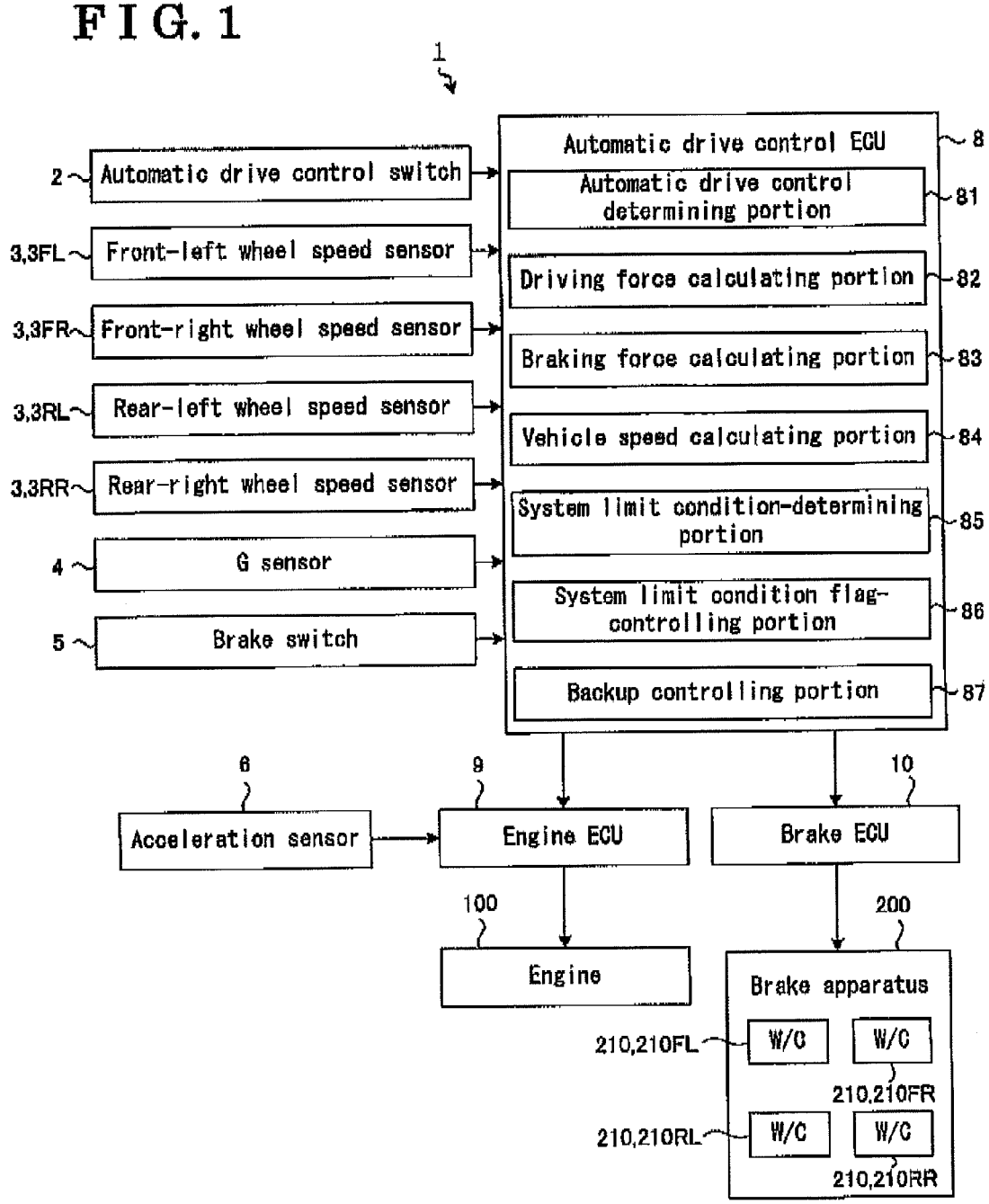
FIG. 1 is a schematic view illustrating a structure of a vehicle drive control device, according to an embodiment.

As illustrated in FIG. 1, a vehicle drive control device, which is indicated by reference numeral 1, is adapted to be mounted on a vehicle (not illustrated) for executing an automatic drive control so that a vehicle speed is controlled to be a target vehicle speed. The vehicle drive control device 1 includes an automatic drive control switch 2, plural wheel speed sensors 3, a G sensor 4, a brake switch 5, an acceleration sensor 6, an automatic drive control ECU 8, an engine ECU 9 and a brake ECU 10. An engine 100, which serves as a driving force generating means, is actuated to generate driving force for driving the vehicle on the basis of a target driving force by the engine ECU 9 so as to activate the vehicle with the generated driving force. The target driving force corresponds to a target control variable. Further, a brake apparatus 200, which serves as a vehicle speed reducing means for reducing the vehicle speed in a driving condition, is actuated to generate braking force on the basis of a target braking force by the brake ECU 10 so as to operate the vehicle with the braking force. The brake apparatus 200 generates the braking force in response to a braking operation performed by an operator, i.e., a pressing operation of a brake pedal (not illustrated) performed by the operator (driver) of the vehicle.

The automatic drive control switch 2 serves as a control starting trigger. The automatic drive control switch 2 is provided in a vehicle compartment (not illustrated) and is turned on when the operator (driver) manually operates the same. The automatic drive control switch 2 is connected to the automatic drive control ECU 8. When turned on by the manual operation of the operator, the automatic drive control switch 2 outputs an ON-signal to the automatic drive control ECU 8. Thus, the automatic drive control switch 2 serves as the control starting trigger for activating the automatic drive control ECU 8 to start the automatic drive control.

The plural wheel speed sensors 3 serve as a wheel speed detecting means for detecting rotational speed of plural wheels of the vehicle (not illustrated). The wheel speed sensor 3 is provided at each of the wheels of the vehicle (not illustrated). The rotational speed of each wheel is detected by means of the corresponding wheel speed sensor 3, thus detecting the rotational speed of the plural wheels. More specifically, in a case where the plural wheels of the vehicle are structured by four wheels including two front wheels and two rear wheels, the wheel speed sensor 3 is provided at the vicinity of each wheel so that the rotational speed of each wheel is independently detected. Herein, when seen in a diving direction of the vehicle, one of the front wheels positioned at a left side is assigned to be a front-left wheel and the other of the front wheels positioned at a right side is assigned to be a front-right wheel. In the same manner, one of the rear wheels positioned at the left side is assigned to be a rear-left wheel and the other of the rear wheels positioned at the right side is assigned to be a rear-right wheel. The wheel speed sensor 3 provided at the front-left wheel is assigned to be a front-left wheel speed sensor 3FL and the wheel speed sensor 3 provided at the front-right wheel is assigned to be a front-right wheel speed sensor 3FR. The wheel speed sensor 3 provided at the rear-left wheel is assigned to be a rear-left wheel speed sensor 3RL and the wheel speed sensor 3 provided at the rear-right wheel is assigned to be a rear-right wheel speed sensor 3RR. The wheel speed sensors 3 (3FL, 3FR, 3RL, 3RR) are connected to the automatic drive control ECU 8 for outputting the detected rotational speed of each wheel to the automatic drive control ECU 8.

The G sensor 4 serves as a gradient detecting means. More specifically, the G sensor 4 is employed for detecting an inclination of the vehicle (not illustrated). In other words, the G sensor 4 detects a gradient θ of a road surface on which the vehicle is currently traveling. The G sensor 4 is connected to the automatic drive control ECU 8 for outputting the detected gradient θ to the automatic drive control ECU 8.

The brake switch 5 serves as a braking operation detecting means. The brake switch 5 is employed for detecting the braking operation performed by the operator. When the operator presses the brake pedal (not illustrated) provided inside the vehicle, for example, the brake switch 5 is turned on. The brake switch 5 is connected to the automatic drive control ECU 8 for outputting an ON-signal to the automatic drive control ECU 8 when the operator presses the brake pedal. Thus, in response to the output of the brake switch 5, the automatic drive control ECU 8 determines whether or not the braking operation is performed by the operator.

The acceleration sensor 6 serves as an acceleration-operational variable detecting means. The acceleration sensor 6 detects an acceleration-operational variable S when the operator performs an accelerating operation. More specifically, the acceleration sensor 6 detects a depression amount of an accelerator pedal (not illustrated) provided inside the vehicle as the acceleration-operational variable S. The acceleration sensor 6 is connected to the engine ECU 9 for outputting the acceleration-operational variable S of the accelerator pedal pressed by the operator.

The automatic drive control ECU 8, which serves as an automatic drive controlling means, calculates a target driving force Fo, which corresponds to a target control variable, so that vehicle speed V is controlled to be a predetermined target vehicle speed Vo (serving as a predetermined target speed) and outputs the target driving force Fo to the engine ECU 9. Further, the automatic drive control ECU 8 calculates a target braking force Bo and outputs the target braking force Bo to the brake ECU 10 so that the vehicle speed V is controlled to be the predetermined target vehicle speed Vo. Herein, the target vehicle speed Vo is a value at which the vehicle (not illustrated) drives at low speed. The target vehicle speed Vo is predetermined, for example, as 10 kilometers per hour (10 km/h).

Thus, the automatic drive control ECU 8 performs an automatic drive control for controlling the vehicle speed V to be the predetermined target vehicle speed Vo by controlling the engine 100 on the basis of the target driving force Fo via the engine ECU 9 and further by controlling the brake apparatus 200 on the basis of the target braking force Bo via the brake ECU 10. In other words, the automatic drive control ECU 8 cooperatively controls the engine 100 and the brake apparatus 200. The automatic drive control ECU 8 includes an automatic drive control determining portion 81, a driving force calculating portion 82, a braking force calculating portion 83, a vehicle speed calculating portion 84, a system critical state-determining portion 85, a system critical state flag-controlling portion 86 and a backup controlling portion 87. Herein, because a hardware configuration of the automatic drive control ECU 8 is already known, a description thereof is omitted.

The automatic drive control determining portion 81 determines whether or not the operator intends to start the automatic drive control. More specifically, the automatic drive control determining portion 81 determines that the automatic drive control is to be started when receiving the ON-signal which is outputted by manually operating the automatic drive control switch 2, and determines that the automatic drive control is not to be started when not receiving the ON-signal from the automatic drive control switch 2. According to the embodiment, the automatic drive control at the low speed is started or released (canceled) by the manual operation of the automatic drive control switch 2 in a condition where the operator performs the braking operation. Alternatively, the automatic drive control at the low speed may be started or released (canceled) regardless of the braking operation performed by the operator. Additionally, when the braking operation of the operator is detected while the automatic drive control is executed, the intention of the operator for executing the braking operation (for reducing the vehicle speed) is prioritized over the automatic drive control, and the control for driving the vehicle at the target vehicle speed Vo is not executed.

The driving force calculating portion 82 calculates the target driving force Fo to be outputted to the engine 100. In the driving force calculating portion 82, the target driving force Fo is calculated for controlling the vehicle speed V to be the predetermined target vehicle speed Vo when the operator intends to start the automatic drive control.

The braking force calculating portion 83 calculates the target braking force Bo to be outputted to the brake apparatus 200. In the braking force calculating portion 83, the target braking force Bo is calculated for controlling the vehicle speed V to be the predetermined target vehicle speed Vo when the operator intends to start the automatic drive control. In a condition where the automatic drive control is performed while the vehicle speed. V is higher than the target vehicle speed Vo and when the brake switch 5 is not turned on and the ON-signal is not outputted therefrom (i.e., when the braking operation of the operator is not detected), the braking force calculating portion 83 outputs the calculated target braking force Bo to the brake ECU 10 so that the vehicle speed V is changed to the target vehicle speed Vo. On the other hand, when the brake switch 5 is turned on and the ON-signal is outputted therefrom (i.e., when the braking operation of the operator is detected), the braking force calculating portion 83 does not output the target braking force Bo which is calculated so that the vehicle speed V is changed to the target vehicle speed Vo.

Further, the brake apparatus 200 includes plural wheel cylinders 210, which are respectively provided at the vicinity of the wheels of the vehicle. For example, one of the wheel cylinders 210 provided at the front-left wheel is assigned to be a front-left wheel cylinder 210FL, and another one provided at the front-right wheel is assigned to be a front-right wheel cylinder 210 FR. Another one of the wheel cylinders 210 provided at the rear-left wheel is assigned to be a rear-left wheel cylinder 210 RL, and the other one provided at the rear-right wheel is assigned to be a rear-right cylinder 210 RR.

The plural wheel cylinders 210 are formed to apply braking force to the corresponding wheels by applying brake torque thereto. Further, each of the wheel cylinders 210 is allowed to adjust the brake torque by adjusting hydraulic pressure applied to each of the wheel cylinders 210. The hydraulic pressure applied to each of the wheel cylinders 210 (210FL, 210FR, 210RL, 210RR) are adjusted independently from one another. Thus, the plural wheel cylinders 210 are provided so as to apply the braking force to the corresponding wheels independently from one another.

Further, the braking force calculating portion 83 calculates the braking force of each of the wheel cylinders 210. The braking force calculating portion 83 outputs the calculated braking force of each of the wheel cylinders 210, thus operating each of the wheel cylinders 210 with different brake torque. Accordingly, the brake apparatus 200 is allowed to apply the different level of braking force to the respective wheels.

The vehicle speed calculating portion 84 serves as a speed calculating means for calculating the vehicle speed V on the basis of the rotational speed of the wheels detected by the wheel speed sensor 3. When the rotational speed of the wheels is inputted to the automatic drive control ECU 8 from the wheel speed sensors 3, the vehicle speed V is calculated by the vehicle speed calculating portion 84. Further, the vehicle speed calculating portion 84 is provided to obtain the rotational speed of each of the plural wheels on the basis of a result detected by the plural wheel speed sensors 3 (3FL, 3FR, 3RL, 3RR). Additionally, according to the embodiment, though the vehicle speed calculating portion 84 is included in the automatic drive control ECU 8, the vehicle speed calculating portion 84 may be provided independently from the automatic drive control ECU 8 as long as the rotational speed of the wheels is inputted to the vehicle speed calculating portion 84 from the wheel speed sensors 3 and the vehicle speed calculating portion 84 is connected to the automatic drive control ECU 8 for outputting the calculated vehicle speed to the automatic drive control ECU 8.

The system critical state-determining portion 85 determines whether or not the vehicle drive control device 1 is in a system critical state with reference to a system critical state flag (not illustrated). The system critical state corresponds to a limit condition (critical state) where the automatic drive control is performed without any malfunction. The system critical state flag is memorized in the automatic drive control ECU 8 or in other member, such as at the engine ECU 9, for example. The system critical state flag-controlling portion 86 changes the system critical state flag to either a flag set state for indicating the system critical state or a flag cleared state for indicating that the vehicle drive control device 1 is not in the system critical state in response to a driving condition of the vehicle.

Further, when the system critical state-determining portion 85 determines that the vehicle drive control device 1 is in the system critical state on the basis of the wheel speed detected by at least one of the wheel speed sensors 3, the system critical state-determining portion 85 compares a system criticality determining speed $\alpha$ and the wheel speed of at least one of the plural wheels detected by the corresponding wheel speed sensor 3. The system criticality determining speed $\alpha$ indicates a predetermined value memorized in the automatic drive control ECU 8 or in other member, such as at the engine ECU 9, for example. Because of the comparison, when the wheel speed of at least one of the plural wheels detected by the corresponding wheel speed sensor 3 exceeds the system criticality determining speed $\alpha$, the system critical state-determining portion 85 determines that the vehicle drive control device 1 is in the system critical state.

The backup controlling portion 87 performs a backup control for the automatic drive control when the vehicle drive control device 1 is in the system critical state. The backup control for the automatic drive control is performed in order to gradually reduce a required output for the engine 100.

The engine ECU 9 is employed for operating the engine 100 on the basis of the target driving force Fo. The engine ECU 9 is connected to the automatic drive control ECU 8 for operating the engine 100 in response to the target driving force Fo calculated by and outputted from the automatic drive control ECU 8.

Figure 2:
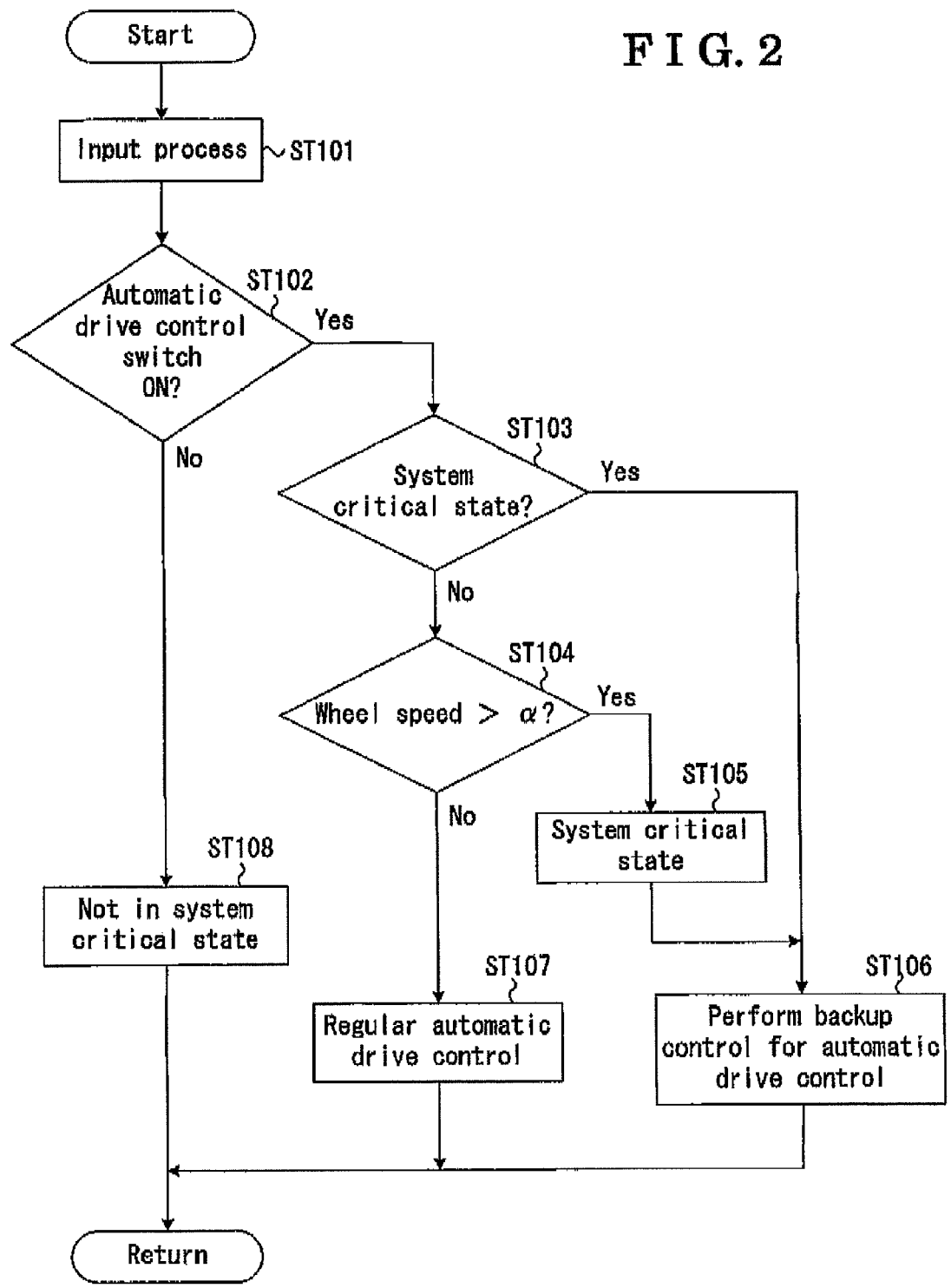
FIG. 2 is an explanatory view illustrating a flow of a performance executed by an automatic chive control ECU of the vehicle drive control device according to the embodiment.

Next, the automatic drive control with the vehicle drive control device 1 according to the embodiment will be described hereinafter. FIG. 2 is an explanatory view illustrating a flow of a performance executed by the automatic drive control ECU 8 of the vehicle drive control device 1. The automatic drive control is performed by a control period of the vehicle drive control device 1. With reference to FIG. 2, the automatic drive control ECU 8 firstly performs an input process (Step ST101). Herein, as the input process, the automatic drive control ECU 8 obtains an ON/OFF state of the automatic drive control switch 2, the wheel speed detected by the wheel speed sensors 3, the gradient θ detected by the G sensor 4, and an ON/OFF state of the brake switch 5, and so on.

Then, the automatic drive control determining portion 81 of the automatic drive control ECU 8 determines whether or not the automatic drive control switch 2 is turned on, i.e., in the ON-state (Step ST102). Herein, the automatic drive control determining portion 81 determines whether or not the operator intends to start the automatic drive control in response to the ON/OFF state of the automatic drive control switch 2.

Then, when the automatic drive control determining portion 81 determines that the automatic drive control switch 2 is in the ON-state (i.e., when an affirmative answer "Yes" is obtained in Step ST 102), the system critical state-determining portion 85 determines whether or not the vehicle drive control device 1 is in the system critical state (Step ST 103) with reference to the system critical state flag (not illustrated) which is memorized in the automatic drive control ECU 8 or in other member, such as the engine ECU 9, for example. More specifically, the system critical state flag is switched to the flag set state or to the flag cleared state by the system critical state flag-controlling portion 86, thus determining whether or not the vehicle drive control device 1 is in the system critical state.

Then, when the system critical state-determining portion 85 determines that the vehicle drive condition is not in the system critical state with reference to the system critical state flag being in the flag cleared state (i.e., a negative answer "No" is obtained in Step ST 103), the system critical state-determining portion 85 determines whether or not the system criticality determining speed $\alpha$ exceeds the wheel speed (wheel speed>system criticality determining speed $\alpha$) (Step ST 104). More specifically, when the wheel speed detected by the wheel speed sensor 3 is equal to or lower than the system criticality determining speed $\alpha$ which is predetermined in the automatic drive control ECU 8, the system critical state-determining portion 85 determines that the vehicle drive control device 1 is still not in the system critical state. On the other hand, when the wheel speed detected by the wheel speed sensor 3 exceeds the system criticality determining speed $\alpha$, the system critical state-determining portion 85 determines that the vehicle drive control device 1 is in the system critical state in Step ST 104. Thus, the condition whether or not the wheel speed exceeds the system criticality determining speed $\alpha$ (wheel speed>system criticality determining speed $\alpha$) serves as a system limit (system critical state) determining condition employed for determining whether or not the vehicle drive control device 1 is in the system critical state.

Further, the system critical state-determining portion 85 determines whether or not the wheel speed V exceeds the system criticality determining speed $\alpha$ by comparing the system criticality determining speed $\alpha$ and the wheel speed of each wheel detected by the corresponding wheel speed sensor 3 (3FL, 3FR, 3RL, 3RR). In other words, the system critical state-determining portion 85 determines whether or not the wheel speed V exceeds the system criticality determining speed $\alpha$ by comparing the system criticality determining speed α with each of the wheel speed detected by the wheel speed sensor 3FL, the wheel speed sensor 3FR, the wheel speed sensor 3RL or the wheel speed sensor 3RR.

Next, when the system critical state-determining portion 85 determines that the wheel speed exceeds the system criticality determining speed α (i.e., an affirmative answer "Yes" is obtained in Step ST 104), the system critical state-determining portion 85 determines that the vehicle drive control device 1 is in the system critical state. In such a condition, the system critical state flag-controlling portion 86 of the automatic drive control ECU 8 switches the system critical state flag to the flag set state for indicating that the vehicle drive control device 1 is in the system critical state (Step ST 105). Herein, when the wheel speed of at least one of the plural wheels exceeds the system criticality determining speed α, the system critical state-determining portion 85 determines that the vehicle drive control device 1 is in the system critical state.

Next, the backup controlling portion 87 performs the backup control for the automatic drive control (Step ST 106). As the backup control, the target driving force Fo is gradually reduced and outputted to the engine ECU 9 so as to reduce the output of the engine 100. The engine ECU 9 actuates the engine 100 in response to the reduced target driving force Fo. In other words, the automatic drive control ECU 8 gradually reduces the output required to the engine 100. More specifically, when the rotational speed of at least one of the plural wheels detected by the corresponding wheel speed sensor 3 exceeds the system criticality determining speed α which corresponds to the predetermined value, the automatic drive control ECU 8 performs a control (a driving force reducing control) for reducing the driving force to be generated by the engine 100, i.e., the output of the engine 100. Herein, according to the embodiment, the automatic drive control ECU 8 gradually reduces the driving force for driving the vehicle with a predetermined time. Alternatively, the automatic drive control ECU 8 may gradually reduce the driving force of the engine 100 with a regular gradient (i.e., the higher the engine output is, the longer the time for reducing the engine output becomes). The backup controlling portion 87 also performs the backup control for the automatic drive control (Step ST 106) when the system critical state-determining portion 85 determines that the vehicle drive control device 1 is in the system critical state with reference to the system critical state flag (i.e., when the affirmative answer "Yes" is obtained in Step ST 103).

Further, the target driving force Fo obtained when the backup control for the automatic drive control is performed is memorized in advance in the automatic drive control ECU 8 or in an outer portion of the automatic drive control ECU (i.e., other member such as the engine ECU 9, for example), After performing the backup control for the automatic drive control, the automatic drive control ECU 8 terminates the current control flow and returns to the start of the control flow.

Back to Step ST 104, when the wheel speed does not exceed the system criticality determining speed α, i.e., when the wheel speed is equal to or lower than the system criticality determining speed α (the negative answer "No" is obtained in Step ST 104), the automatic drive control ECU 8 performs a regular automatic drive control (Step ST 107). As the regular automatic drive control, the driving force calculating portion 83 calculates the target driving force Fo so that the vehicle speed V is controlled to be the predetermined target vehicle speed Vo, and the braking force calculating portion 83 calculates the target braking force Bo so that the vehicle speed V is controlled to be the predetermined target vehicle speed Vo. The driving force calculating portion 82 calculates the required output, which is outputted via the engine ECU 9 to the engine 100, on the basis of the calculated target driving force Fo. The engine ECU 9 controls the engine 100 so that the output of the engine 100 is controlled to be the required output.

Further, the brake ECU 10 controls the brake apparatus 200 on the basis of the target braking force Bo calculated by the braking force calculating portion 83. More specifically, the brake ECU 10 calculates the hydraulic pressure to be applied to the wheel cylinders 210 on the basis of the target braking force Bo and then applies the calculated hydraulic pressure to the wheel cylinders 210. Accordingly, the wheel cylinders 210 generate the brake torque and apply the braking force to the corresponding wheels.

Further, in a condition where the idling state (i.e. slipping state) of at least one of the wheels is detected on the basis of the wheel speed detected by the wheel speed sensors 3, the braking force calculating portion 83 increases the brake torque of one of the wheel cylinders 210 which is provided at the vicinity of the slipping (idling) wheel from among the plural wheels. For example, when the wheel speed detected by the front-left wheel speed sensor 3FL is higher than the wheel speed detected by the other wheel speed sensors (3FR, 3RL, 3RR), the slip (idling) of the front-left wheel is detected. In such a state, by increasing the hydraulic pressure applied to the front-left wheel cylinder 210FL to be larger than the hydraulic pressure applied to the other wheel cylinders 210 (210 FR, 210 RL, 210 RR), the braking force calculating portion 83 increases the brake torque of the front-left wheel cylinder 210 FL. Thereby, the slip of the front-left wheel is restrained. After performing the regular automatic drive control, the automatic drive control ECU 8 terminates the current control flow and returns to the start of the control flow.

Back to Step ST 102, when the automatic drive control determining portion 81 determines that the automatic drive control switch 2 is in an OFF-state (i.e., when the negative answer "No" is obtained in Step ST 102), the system critical state flag-controlling portion 86 switches the system critical state flag to the flag cleared state for indicating that the vehicle drive control device 1 is not in the system critical state (Step ST 108). Herein, when the operator does not intend to start the automatic drive control, i.e., when the automatic drive control is not performed, the vehicle drive control device 1 is not in the system critical state. In such a state, the system critical state flag-controlling portion 86 changes the system critical state flag to the flag cleared state for indicating that the vehicle drive control device 1 is not in the system critical state. After controlling the system critical state flag as described above, the automatic drive control ECU 8 terminates the current control flow and returns to the start of the control flow.

Figure 3:
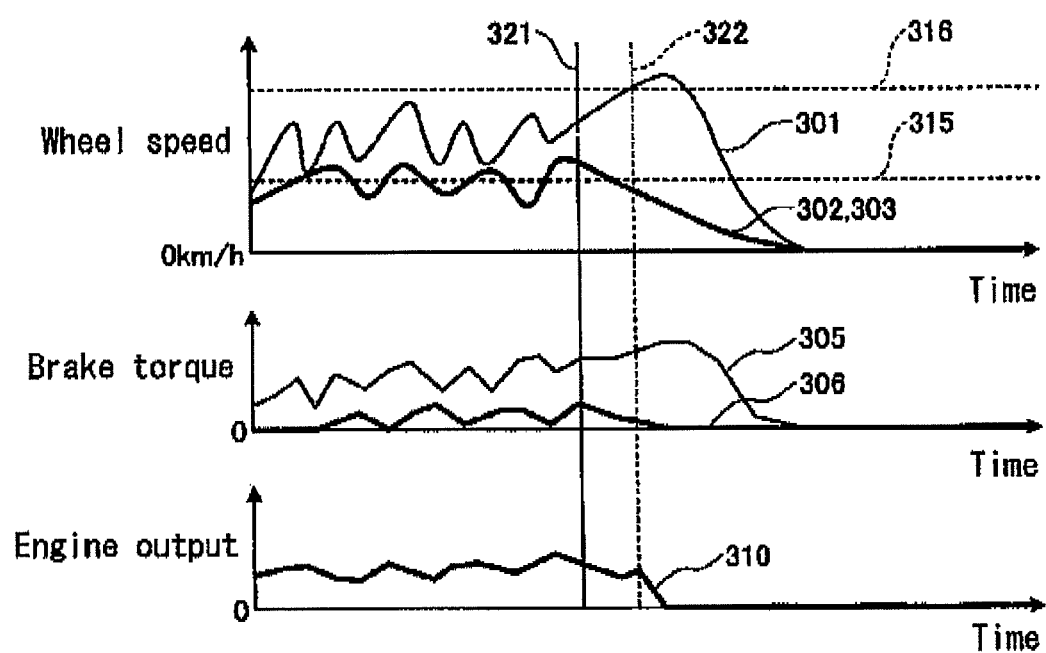
FIG. 3 is an explanatory view illustrating wheel speed, hydraulic pressure indicating brake torque for wheels, and an engine output, which are obtained when a slip is generated to at least one of the wheels, according to the embodiment.
Figure 4:
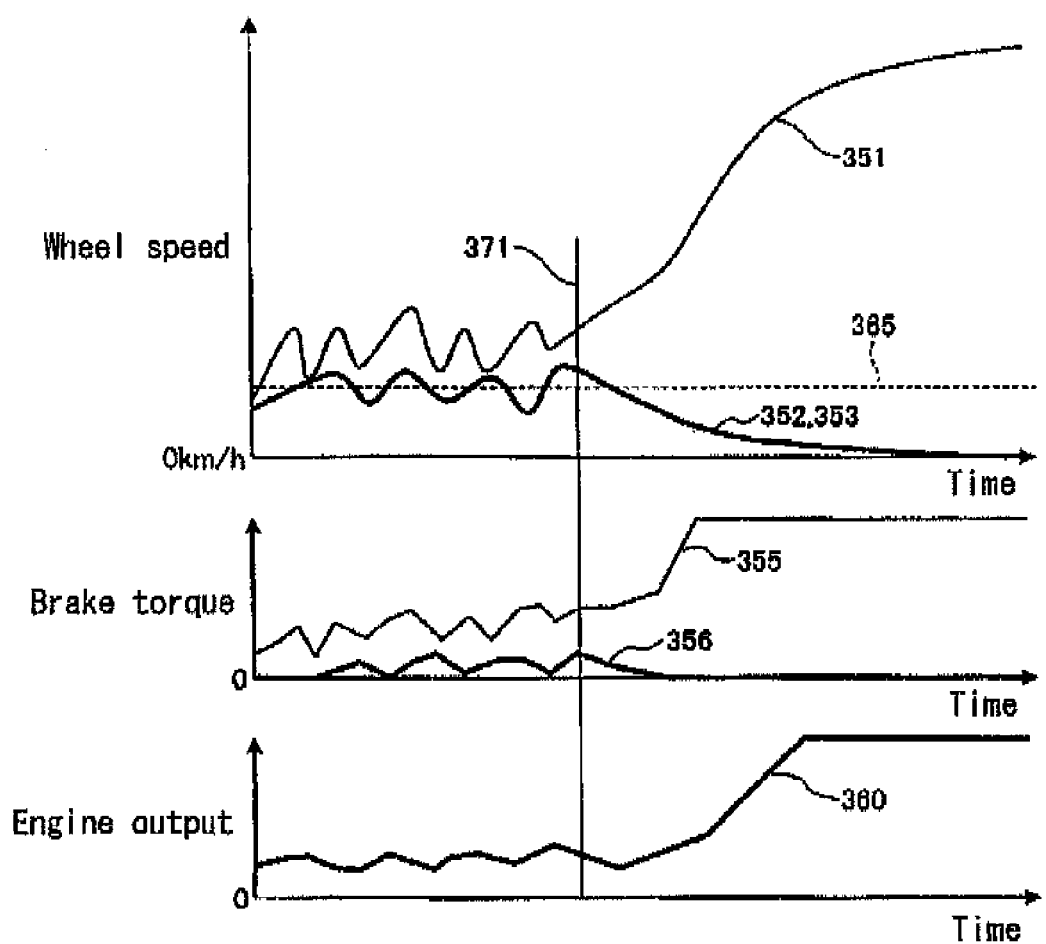
FIG. 4 is an explanatory view illustrating wheel speed, brake torque for wheels, and an engine output, which are obtained when a slip is generated to the at least one of the wheels, according to a known vehicle drive control device.

FIG. 3 is an explanatory view illustrating the wheel speed, the brake torque (hydraulic pressure) for the wheels and the engine output, which are obtained when the slip is generated to at least one of the plural wheels. When the wheel speed of at least one of the plural wheels from among the wheel speed detected by the plural wheel speed sensors 3 (3FL, 3FR, 3RL, 3RR) exceeds the system criticality determining speed α, the vehicle drive control device 1 reduces the output of the engine 100. In other words, when at least one of the wheels is slipping and the rotational speed of the slipping wheel(s) is to be restrained by the brake apparatus 200 and further in a condition where the braking force to the slipping wheel(s) is reduced due to the fading of the brake pad, for example, a slipping wheel speed 301 corresponding to the rotational speed of the slipping wheel(s) is changed to be higher than a non-slipping wheel speed 302 corresponding to the rotational speed of the non-slipping wheels, as is illustrated in FIG. 3.

Hereinbelow, the description refers to a condition where only one of the plural wheels is slipping, however, the slip may occur to more than one wheel from among the plural wheels.

In a state described above, in order to reduce the rotational speed of the slipping wheel, a slipping wheel brake torque 305 applied to the slipping wheel is arranged to be higher than a non-slipping wheel brake torque 306 applied to non-slipping wheels. However, when the fading of the brake pad occurs (a fading occurrence time 321), the braking force is reduced, so that the slipping wheel speed 301. Herein, a differential mechanism (not illustrated) is operated for applying the same level of driving torque from the engine 100 (power source) to inner and outer wheels (left and right wheels). Therefore, after the fade occurrence time 321, the driving torque is applied to the slipping wheel, which receives less load, more than the non-slipping wheel. Thus the slipping wheel speed 301 is further increased.

Herein, in a condition where a speed difference between the slipping wheel speed 301 and the non-slipping wheel speed 302 is generated, the automatic drive control ECU 8 detects the slower wheel speed from among the slipping wheel speed 301 and the non-slipping wheel speed 302 as a vehicle speed 303(V). Accordingly, the automatic drive control ECU 8 increases the target driving force Fo so that the vehicle speed 303(V) approaches a target vehicle speed 315 (Vo) and further increases an engine required output 310 corresponding to the required output of the engine 100. Therefore, the output of the engine 100 is increased while the slipping wheel speed 301 is further increased due to the increase of the output of the engine 100.

Thus, in a condition where the slipping wheel speed 301 which is increased due to the increase of the engine required output 310 exceeds a system criticality determining speed 316($\alpha$), the automatic drive control ECU 8 determines that the vehicle drive control device 1 is in the system critical state. Therefore, the automatic drive control ECU 8 reduces the engine required output 310. Accordingly, the output of the engine 100 is reduced, so that the slipping wheel speed 301 is also reduced. In other words, after a system critical state detected time 322, because the output of the engine 100 is reduced, both of the slipping wheel speed 301 and the non-slipping wheel speed 302 are reduced, thus reducing the vehicle speed 303(V).

Accordingly, when the rotational speed of at least one of the plural wheels detected by the wheel speed sensors 3 exceeds the system criticality determining speed 316 ($\alpha$) while the automatic drive control is executed, the output of the engine 100 is restrained from being excessively increased by performing a control for reducing the output of the engine 100 (driving force reducing control), thereby restraining the malfunction such as damage of the engine 100 and a drive train (not illustrated). Consequently, a malfunction due to the generation of the slip of at least one of the wheels while the automatic drive control is executed is restrained.

Further, when it is determined that the vehicle drive control device 1 is in the system critical state, the automatic drive control ECU 8 gradually reduces the output of the engine 100 by gradually reducing the target driving force Fo and then outputting the reduced target driving force Fo to the engine ECU 9. When determined that the vehicle drive control device 1 is in the system critical state, the automatic drive control ECU 8 gradually reduces the output of the engine 100 while maintaining the automatic drive control without canceling (stopping) the automatic drive control, thereby gradually changing a condition of the vehicle drive control with the predetermined time when the vehicle drive control device 1 is in the system critical state. Therefore, the operator of the vehicle easily reacts to the change of the condition of the vehicle drive control. In other words, when it is determined that the drive control device 1 is in the system critical state, the automatic drive control is switched to the backup control, thus terminating the current control with time allowance. Consequently, stability of the vehicle while the vehicle is driven by executing the automatic drive control is improved.

In the vehicle drive control device 1 according to the embodiment described above, the determination upon whether or not the vehicle drive control device 1 is in the system critical state is obtained in one determining process by comparing the system criticality determining speed $\alpha$ and the wheel speed detected by each wheel speed sensor 3. Alternatively, a monitoring time may be provided for determining whether or not the vehicle drive control device 1 is in the system critical state. The slip of the wheel(s) may be generated temporally depending on a driving condition of the vehicle. In such a state, the wheel speed may momentarily exceed the system criticality determining speed $\alpha$. Therefore, a predetermined monitoring time may be provided for determining the system critical state of the vehicle drive control device 1, and the automatic drive control ECU 8 may determine that the vehicle drive control device 1 is in the system critical state when the wheel speed continuously exceeds the system criticality determining speed $\alpha$ during the monitoring time. Thus, the system critical state of the vehicle drive control device 1 may be detected more accurately.

Further, the system criticality determining speed $\alpha$ is defined as the predetermined value memorized in the automatic drive control ECU 8 or in the outer portion of the automatic drive control ECU 8 (other member such as the engine ECU 9). Alternatively, the system criticality determining speed $\alpha$ may be defined as a variable, which varies in response to the target vehicle speed Vo and/or the vehicle condition. By defining the system criticality determining speed $\alpha$ as the variable value, whether or not the vehicle drive control device 1 is in the system critical state is determined appropriately in response to the driving condition of the vehicle Still further, when the operator of the vehicle performs the accelerating operation or the braking operation, the constant speed is not maintained. Therefore, the determination of the system critical state of the vehicle drive control device 1 may not be performed while the operator performs the accelerating operation or the braking operation. In a condition where one of the wheels is slipping while the operator of the vehicle performs the accelerating operation or the braking operation, the operator may execute an appropriate operation for the slip of the wheel(s) by the accelerating operation and the braking operation. Therefore, the malfunction such as an excessive increase of the output of the engine caused when the slip of the wheel(s) is generated may be restrained. Consequently, a needless determination is not performed thus reducing a load of the ECU (the automatic drive control ECU 8).

Still further, in the vehicle drive control device 1 according to the embodiment described above, the brake apparatus 200 adjusts the brake torque by adjusting the hydraulic pressure for the master cylinders 210. Alternatively, the brake apparatus 200 may adjust the brake torque in another manner. For example, the brake apparatus 200 may be mounted on a vehicle, such as a hybrid-type vehicle or an electric vehicle, which includes a driving force generating apparatus having an electric driving source (a motor). In such a case, the brake apparatus 200 may include a regenerative braking mechanism and may change the level of the brake torque by changing the level of regenerated electric force. A form and/or function of the brake apparatus 200 may be modified as long as the brake apparatus 200 adjusts the brake torque to be applied to the plural wheels independently from one another.

As described above, the vehicle drive control device 1 is applicable for a vehicle with which the automatic drive control is performed. More specifically, the vehicle drive control device 1 is applied for a vehicle with which the automatic drive control is performed by detecting the vehicle speed by means of detecting means such as sensors.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle drive control device, comprising:
   a wheel speed detecting means for detecting a rotational speed of a plurality of wheels of a vehicle;
   a vehicle speed calculating means for calculating a vehicle speed on the basis of the rotational speed of the plurality of wheels detected by the wheel speed detecting means; and
   an automatic drive controlling means for performing an automatic drive control for controlling the vehicle speed to be a predetermined target speed by controlling a driving force generating means and a vehicle speed reducing means for the vehicle, and terminating the automatic drive control when the rotational speed of at least one of the plurality of wheels detected by the wheel speed detecting means exceeds a predetermined value after performing a driving force reducing control for reducing a driving force of the vehicle to be generated by the driving force generating means.

2. A vehicle drive control device according to claim 1, wherein
   the automatic drive controlling means gradually reduces the driving force of the vehicle with a predetermined time when performing the driving force reducing control in the condition where the rotational speed of at least one of the plurality of wheels detected by the wheel speed detecting means exceeds the predetermined value.

3. The vehicle drive control device according to claim 1, wherein the predetermined value is set as a system critical state determining speed, which is used for determining whether or not the vehicle drive control device is in a system critical state corresponding to a limit condition where the automatic drive control is executable without causing any malfunction.

4. A method for controlling a vehicle driving, comprising:
   detecting a rotational speed of a plurality of wheels of a vehicle;
   calculating a vehicle speed on the basis of the rotational speed of the plurality of wheels of the vehicle for controlling the vehicle speed to be a predetermined target speed by controlling a driving force generating means and a vehicle speed reducing means for the vehicle;
   comparing the rotational speed of each of the plurality of wheels of the vehicle and a predetermined value; and
   terminating the automatic drive control when the rotational speed of at least one of the plurality of wheels detected by the wheel speed detecting means exceeds a predetermined value after reducing a driving force of the vehicle to be generated by the driving force generating means.

5. The method for controlling a vehicle according to claim 4, wherein the predetermined value is set as a system critical state determining speed, which is used for determining whether or not a system critical state, corresponding to a limit condition where the automatic drive control is executable without causing any malfunction, exists.

* * * * *